(12) United States Patent
Ng et al.

(10) Patent No.: US 8,792,445 B2
(45) Date of Patent: Jul. 29, 2014

(54) DOWNLINK CONTROL SIGNALLING FOR DOWNLINK MIMO (75) Inventors: Boon Loong Ng, Victoria (AU); Jiun Siew, Victoria (AU)

(73) Assignee: NEC Corporation, Tokyo (JP)

( * ) Notice: Subject to any disclaimer, the term of this patent is extended or adjusted under 35 U.S.C. 154(b) by 121 days.

(21) Appl. No.: 13/504,428

(22) PCT Filed: Jul. 14, 2010

(86) PCT No.: PCT/JP2010/062386
§ 371 (c)(1),
(2), (4) Date: Apr. 26, 2012

(87) PCT Pub. No.: WO2011/052273
PCT Pub. Date: May 5, 2011

(65) Prior Publication Data
US 2012/0213186 A1 Aug. 23, 2012

(30) Foreign Application Priority Data

Oct. 29, 2009 (AU) .............................. 2009905306

(51) Int. Cl.
H04L 12/26 (2006.01)
H04L 5/00 (2006.01)
H04L 1/18 (2006.01)
H04L 5/02 (2006.01)

(52) U.S. Cl.
CPC ............ *H04L 5/0007* (2013.01); *H04L 1/1861* (2013.01); *H04L 5/026* (2013.01)
USPC ............ 370/329; 370/328; 370/252; 370/480

(58) Field of Classification Search
CPC ..... H04L 5/0007; H04L 5/0053; H04L 5/006; H04L 1/0625; H04L 1/1861; H04L 25/0204
USPC ................ 370/252, 328–331, 135, 480, 295; 375/295, 135, 260
See application file for complete search history.

(56) References Cited

U.S. PATENT DOCUMENTS

2005/0089116 A1* 4/2005 Moffatt et al. ................ 375/295
2009/0245187 A1* 10/2009 Nam et al. .................... 370/329

(Continued)

FOREIGN PATENT DOCUMENTS

WO    WO 2010145068 A1 * 12/2010 ............... H04L 5/00

OTHER PUBLICATIONS

Research in Motion, UK Limited, Signaling of DM-RS Port for LTE-A MIMO Transmission, 3GPP TSG RAN WG1 Meeting #58bis, Oct. 2009, pp. 1-9.

(Continued)

*Primary Examiner* — Dang Ton
*Assistant Examiner* — Sai Aung
(74) *Attorney, Agent, or Firm* — Foley & Lardner LLP (57) ABSTRACT A method of downlink control signalling for downlink multiple input/multiple output (MIMO) operation between a Base Transceiver Station (BTS) and User Equipment (UE) includes the following steps. Maintaining one or more mapping tables at a network location accessible by the UE, the mapping tables including first UE signalling data. Transmitting a message index to the UE to enable relevant first UE signalling data to be read by the UE. Transmitting second UE signalling data to the UE. At the UE, using the first and second UE signalling data to derive UE control data.

9 Claims, 8 Drawing Sheets

(56) References Cited

U.S. PATENT DOCUMENTS

| | | | |
|---|---|---|---|
| 2010/0195566 A1* | 8/2010 | Krishnamurthy et al. | 370/328 |
| 2010/0309808 A1* | 12/2010 | Miki et al. | 370/252 |
| 2011/0103341 A1* | 5/2011 | Ko et al. | 370/329 |
| 2011/0142076 A1* | 6/2011 | Ko et al. | 370/480 |
| 2011/0222588 A1* | 9/2011 | Ko et al. | 375/135 |

OTHER PUBLICATIONS

3GPP TS 36.213 V8.8.0, Downlink Power Allocation, Sep. 2009, pp. 15-16.

Motorola, Control Signaling for LTE Rel-9 Enhanced DL Transmission, 3GPP TSG RAN WG1 #58bis, R1-093955, Oct. 2009, pp. 1-5.

NEC Group, Downlink Control Signaling Support for SU/MU-MIMO, 3GPP TSG-RAN WG1 Meeting #59, R1-094730, Nov. 2009, 7 pages.

Philips, Some RS Design Issues for Dual Layer Beamforming. 3GPP TSG RAN WG1 Meeting #58bis, R1-094329, Internet. <URL:http://www.3gp.org/ftp/tsg_ran/WG1_RL1/TSGR1_58b/Docs/R1-094329 zip>, Oct. 2009.

Ericsson, ST-Ericsson, Downlink Demodulation RS Design for Rel-9 and Beyond, 3GPP TSG-RAN WG1 Meeting #57b, R1-092734, Internet, URL:http://www.3gp.org/ftp/tsg_ran/WG1_RL1/TSGR1_57b/Docs/R1-092734.zip>, Jul. 2009.

ZTE, Further Investigation on Higher Order DMRS Deisgn, 3GPP TSG RAN WG1 Meeting #58bis, R1-093808, Internet, URL:http://www.3gp.org/ftp/tsg_ran/WG1_RL1/TSGR1_58b/Doc/R1-093808.zip>, Oct. 2009.

* cited by examiner

DOWNLINK CONTROL SIGNALLING FOR DOWNLINK MIMO

This application is the National Phase of PCT/JP2010/062386, filed Jul. 14, 2010, which claims priority to Australian Provisional Application No. 2009905306, filed Oct. 29, 2009, the disclosures of which are hereby incorporated by reference in their entirety.

TECHNICAL FIELD

The field of the invention relates generally a method of downlink control signalling for downlink multiple input/multiple output operation between a Base Transceiver Station and User Equipment. The invention has particular application to downlink control signalling between an evolved Node B (eNB) and UE forming part of an LTE-Advanced telecommunication system, and it will be convenient to describe the invention in relation to that exemplary application.

BACKGROUND ART

In Long Term Evolution (LTE), the concept of downlink Multiple Input Multiple Output (MIMO) antennas is used to help achieve high peak data rates. In an LTE system, multiple antennas are used at the transmitting eNode B (eNB) and also at the receiving User Equipment (UE). e Node B is the term used in UMTS to denote the Base Transceiver Station (BTS) in an LTE system. By using multiple antennas at both the eNB and UE, the data rates of one individual UE are able to be increased given the appropriate channel conditions.

To further enhance the overall network capacity, further extensions of Multi-user MIMO (MU-MIMO) technology are being further extended in LTE-Advanced systems. As the name suggests, MU-MIMO technology utilises a particular time and frequency resource to serve more than one UE while transmitting with more than a single antenna both at the eNB and UEs. To distinguish between the single and multi-user scenario, the terms SU-MIMO and MU-MIMO are used.

Figure 1:
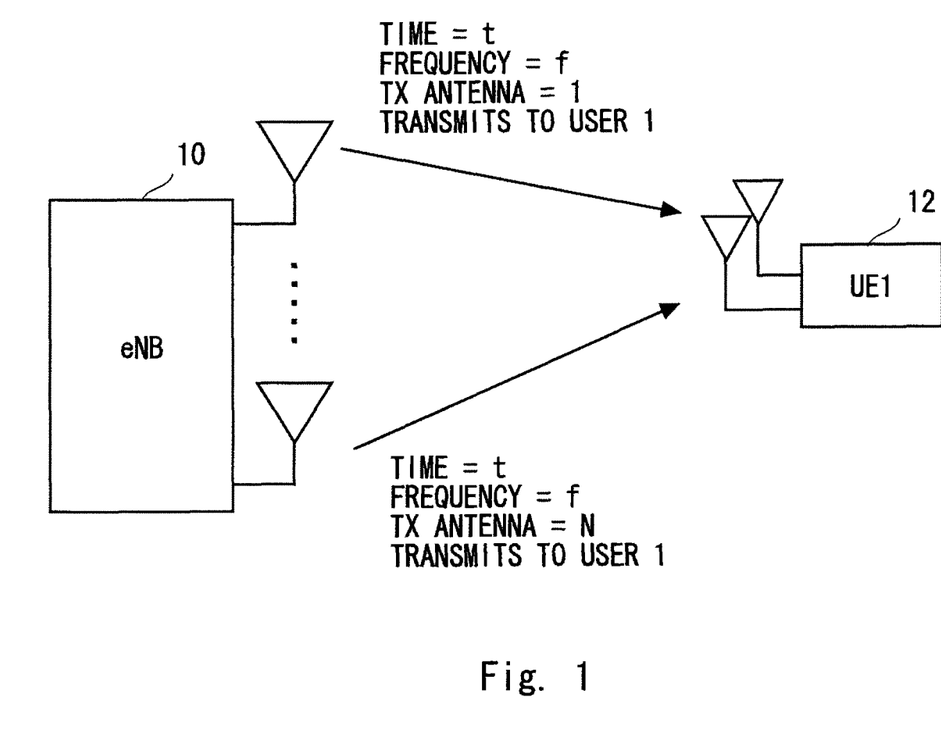
FIG. 1 is a schematic diagram depicting an eNB and UE in SU-MIMO communication.
Figure 2:
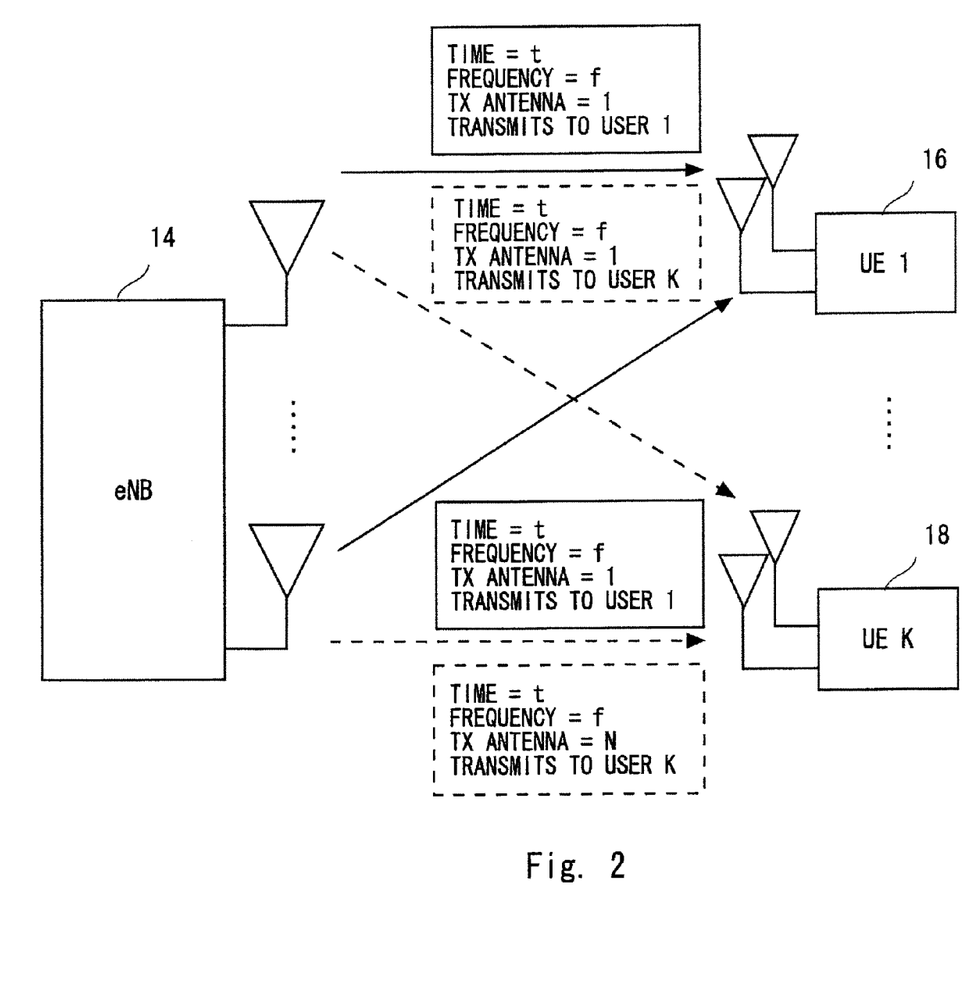
FIG. 2 is a schematic diagram depicting an eNB and UEs in MU-MIMO communication.

The general idea of SU and MU-MIMO is illustrated in FIGS. 1 and 2 respectively. FIG. 1 depicts an eNB 10 in SU-MIMO communication with UE 12, whereas FIG. 2 depicts an eNB 14 in MU-MIMO communication with UEs 16 and 18.

Figure 3:
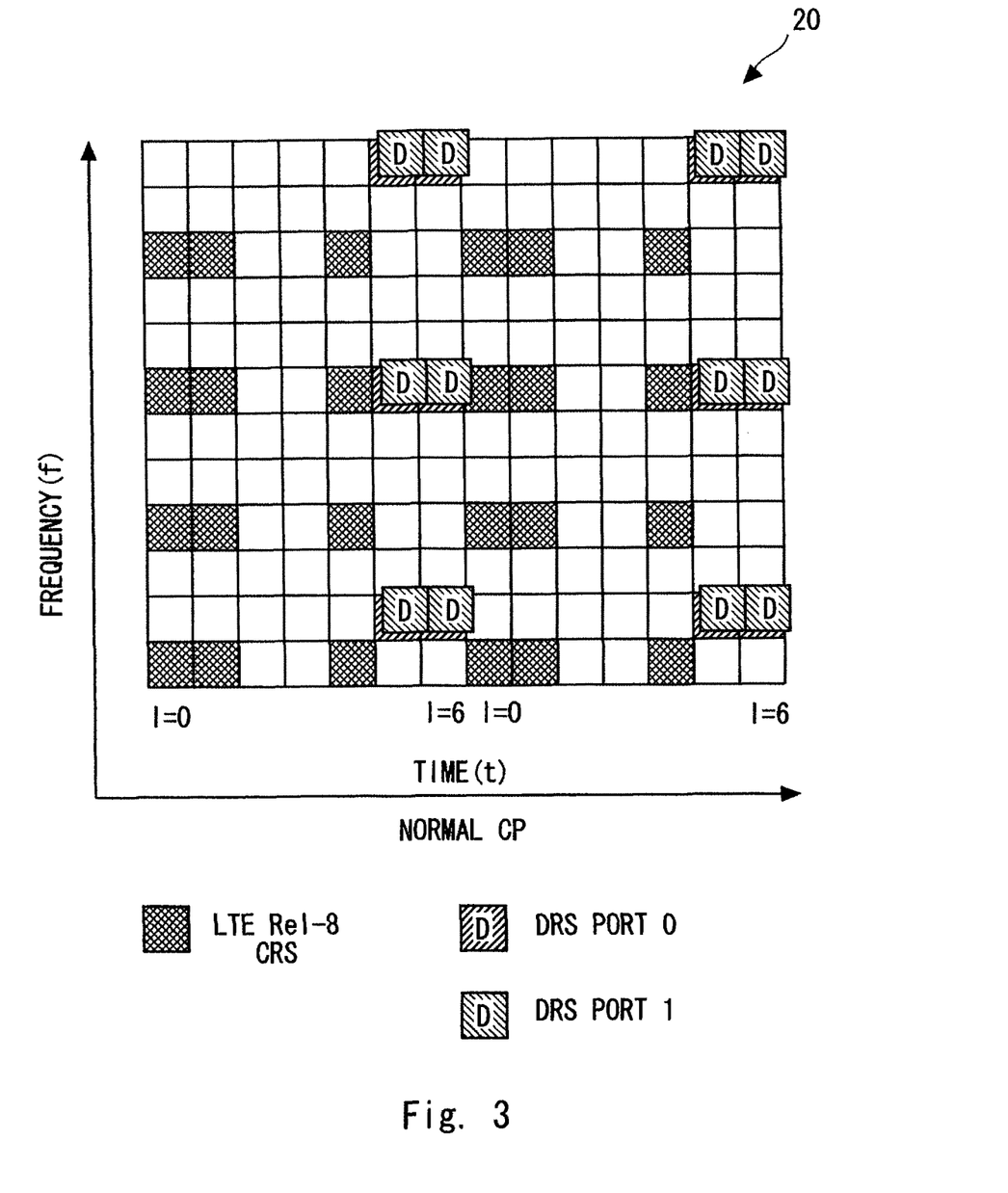
FIG. 3 is a resource block depicting a DM-RS pattern for two transmission layers.
Figure 4:
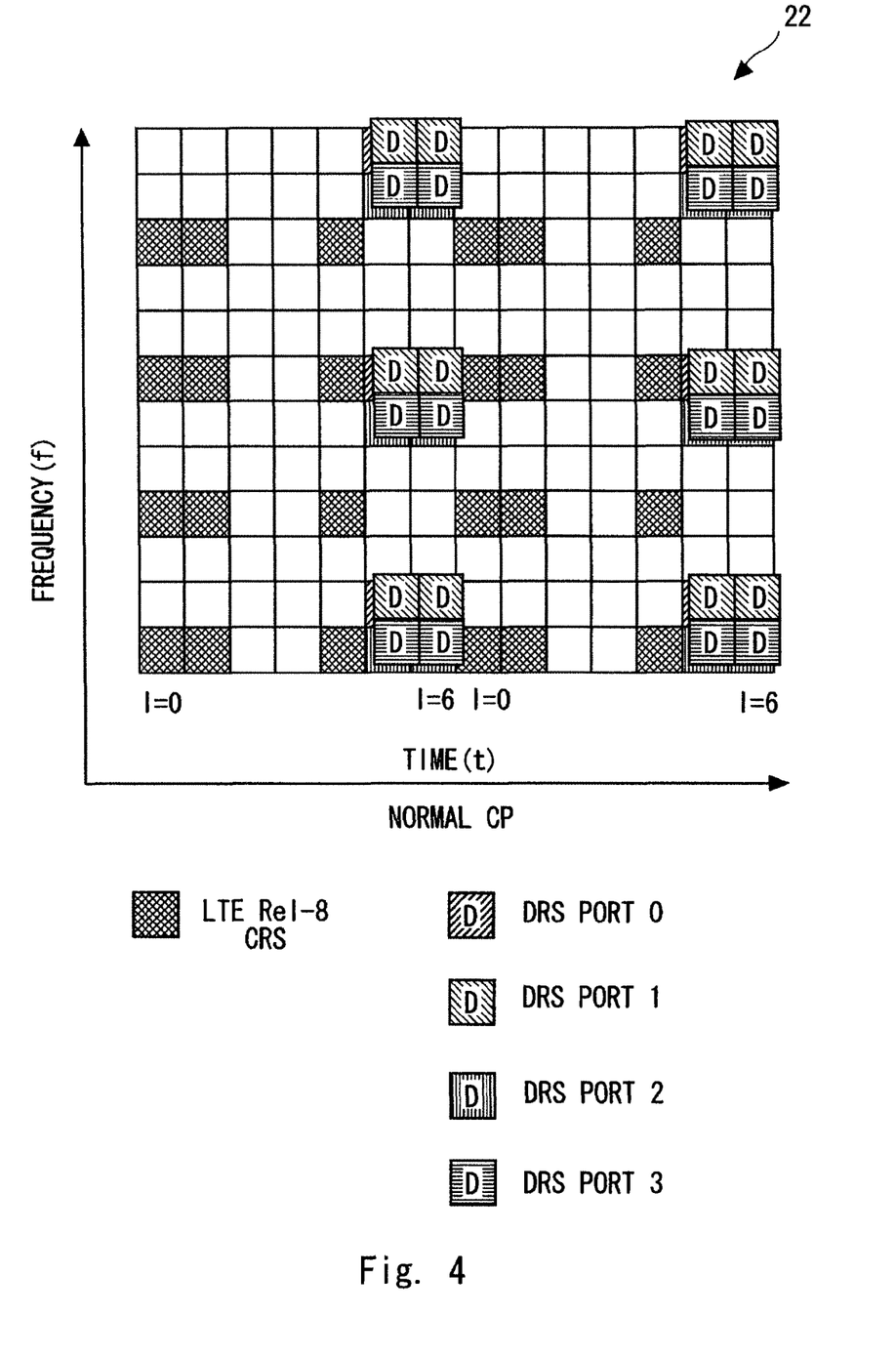
FIG. 4 is a resource block depicting a DM-RS pattern for four transmission layers.
Figure 5:
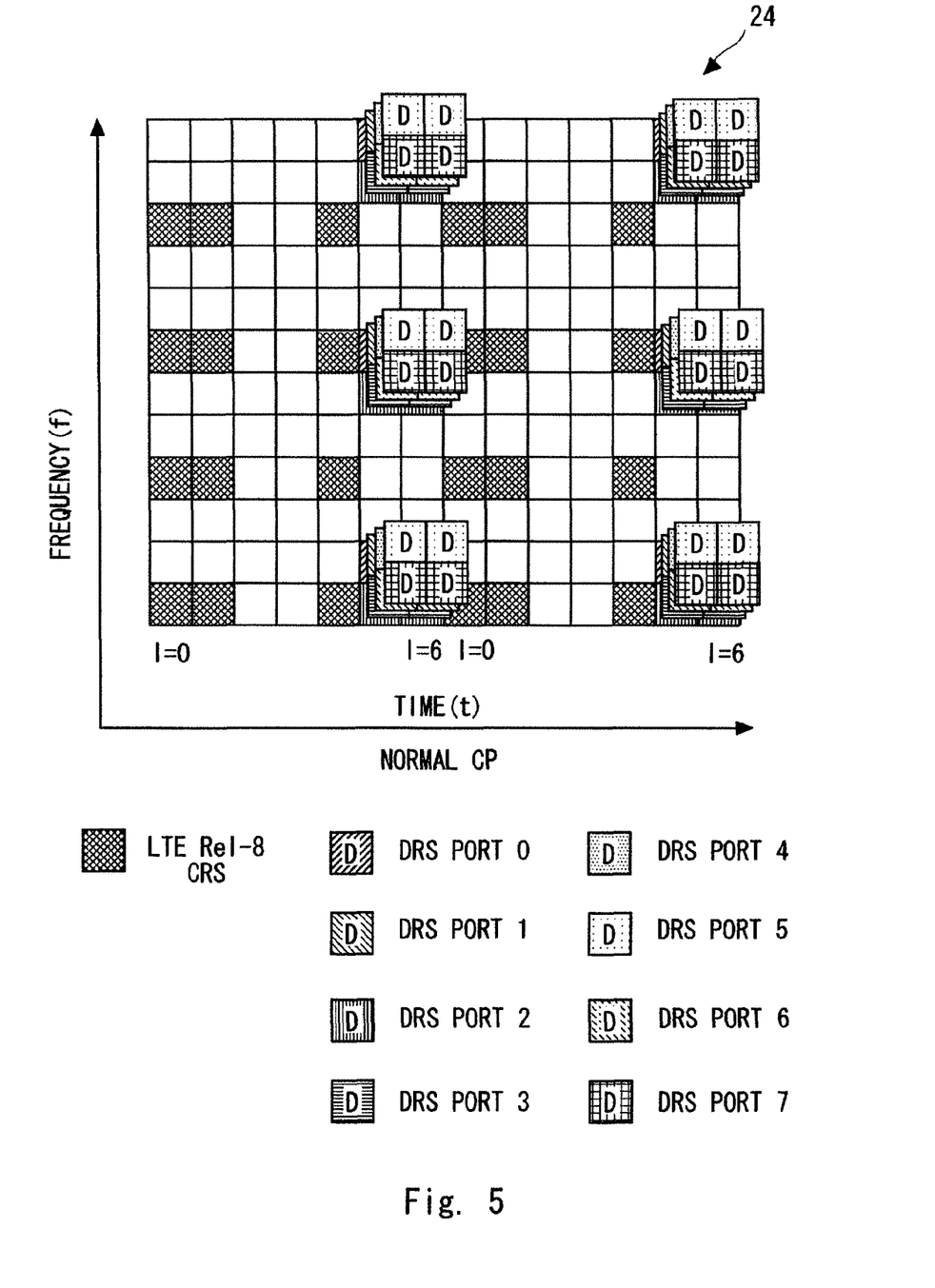
FIG. 5 is a resource block depicting a DM-RS pattern for eight transmission layers.

To facilitate the use of higher order MIMO without incurring serious overhead, the use of dedicated reference signals (DRS) for demodulation (DM-RS) has been adopted by the 3rd Generation Partnership Program (3GPP). Within the SU-MIMO context, DM-RS implies that reference signals contained within the resource block designated to the particular UE are to be used solely by that UE. Although the structure of the DM-RS has yet to be decided, schemes using a combination of frequency division and code division multiplexing are being considered. These are illustrated in FIGS. 3 to 5, which respectively depict resource blocks 20 to 24. The resource blocks 20 to 24 respectively depict DM-RS patterns for up to two, four and eight transmission layers.

Within the MU-MIMO context however, the issue is more complicated. Since the same time and frequency resource is shared by more than one UE, the DM-RS could also potentially be shared by different UEs. This however, would increase the cross interference from one UE to another thereby degrading the channel estimation and overall throughput performance of each UE.

To circumvent this problem, 3GPP has adopted the use of different UEs being mapped to different layers. For example, if the eNB has a total of 4 layers available and needs to serve two UEs using the same time and frequency resources, it can use the first two layers to transmit data to the first UE while the last two layers can be used to serve the second UE. Using such a mapping would therefore imply that each UE would use the DM-RS from the layers it is assigned in order to estimate the channel.

SUMMARY OF INVENTION

Technical Problem

The use of MU-MIMO technology with the DM-RS structure described above poses several challenging problems, some of which are listed below:

<1. Transparent SU/MIMO Operation>

It is desired within 3GPP that the operation of SU and MU-MIMO should be transparent to the UE. This means that the eNB should be able to dynamically switch between SU and MU-MIMO transmission without having to signal to the UE the specific mode it is operating in. This implies that SU-MIMO and MU-MIMO can be implemented as a single transmission mode.

<2. Control Signalling of Assigned Layers>

By assigning different UEs to different layers the UE needs to know which layer it has been assigned to in order to appropriately detect the DM-RS, perform channel estimation based on the DM-RS and demodulate its data. The signalling of the used layers is so far an open problem.

<3. Maintaining Full Power Utilisation>

The UE must know the ratio of RS EPRE and PDSCH EPRE used by the eNB in order to appropriately demodulate the data (if the data is QAM modulated or if it is >rank1 transmission). In Rel-8, such this power ratio information is signalled to the UE. One of the advantages of using dedicated RS as DM-RS is that the ratio of RS EPRE and PDSCH EPRE need not be signalled to the UE if the power ratio is always fixed or known to the UE. For example, if the DMRS multiplexing method is pure CDM, then the power ratio can be fixed to 0 dB. If the DM-RS multiplexing is implemented as a hybrid of CDM and FDM, then there are two options:

(1) The power ratio is fixed to a single value. The disadvantage of this option is the under utilisation of transmit power for the DM-RS as explained below:

(*) In the example shown in FIG. 5, a maximum of only 4 layers of DM-RS are mapped to one resource element. However, on the resource element used for data, up to 8 layers may be mapped. As such if the power ratio is fixed to 0 dB, the total power of the resource element with DM-RS (summing 4 layers), is only half of the total power of data RE (summing 8 layers). Hence, half of the power is wasted and this ultimately results in performance degradation.

(2) The power ratio is a function of the layer assignment to the UEs with the aim to better utilise the transmit power at eNB.

(*) Referring to the example given in in the first option, the ratio of DM-RS EPRE to PDSCH EPRE would be 2 in order to better utilise the transmit power for DM-RS. In addition, the channel estimation accuracy based on DM-RS will also improve, which directly translate to increased PDSCH throughput.

The Applicants have determined that that Option 2 above is preferred. In the case of SU-MIMO, the UE can determine the power ratio given the individual DM-RS port assignment information. In the case of MU-MIMO though, the individual DM-RS port assignment information will not be sufficient as the power ratio also depends on the DM-RS port assignments to the other UEs sharing the same resource block. As such, a mechanism is required such that this ratio is known by each UE in order to appropriately demodulate its data.

<4. Control Signalling Overhead>

The method of conveying such information (used layers and power offset) will obviously incur additional overhead. This overhead should be minimised as much as possible so make the most efficient and cost effective use of the given data transmission resources.

It would be desirable to provide a method of downlink control signalling for downlink multiple input/multiple output operation between a Base Transceiver Station and User Equipment which ameliorates or overcomes one or more of these problems.

Solution to Problem

In a first aspect, the invention provides a method of downlink control signalling for downlink multiple input/multiple output (MIMO) operation between a Base Transceiver Station (BTS) and User Equipment (UE). The method includes the steps of:

maintaining one or more mapping tables at a network location accessible by the UE, the mapping tables including first UE signalling data;

transmitting a message index to the UE to enable relevant first UE signalling data to be read by the UE;

transmitting second UE signalling data to the UE; and at the UE, using the first and second UE signalling data to derive UE control data.

In one or more embodiments, the UE control data includes UE rank and UE DM-RS port assignments. The UE control data may further includes a power ratio of the DM-RS to data symbols transmitted to the UE.

A first of the mapping tables may maps the second UE signalling data to the UE's assigned DM-RS ports. The second UE signalling data may include UE rank and a UE DM-RS port index.

The method may further include the step of:

at the UE, using the second UE signalling data and the first mapping table to determine UE DM-RS port assignments.

A second of the mapping tables may map the message index to the number of transmission layers assigned to a first CDM group of DM-RS ports.

The second mapping table may also map the message index to the total number of transmission layers assigned to all DM-RS ports. Alternatively, the second mapping table may also map the message index to the number of transmission layers assigned to a second CDM group of DM-RS ports.

The method may further include the step of:

at the UE, using the transmitted message index and the second mapping table to determine the total number of transmission layers used by the BTS and the number of transmission layers assigned to one or more CDM groups of DM-RS ports.

A third of the mapping tables may map the total number of transmission layers used by the BTS and the number of transmission layers assigned to one or more CDM groups of DM-RS ports to the power ratio of the DM-RS to data symbols transmitted to the UE. In this case, the method may further include the step of:

at the UE, using the total number of transmission layers used by the BTS, the number of transmission layers assigned to one or more CDM groups of DM-RS ports and the third mapping table to derive the power ratio of the DM-RS to data symbols transmitted to the UE.

In an alternative embodiment, a fourth of the mapping tables maps the message index to the power ratio of the DM-RS to data symbols transmitted to the UE. In this case, the method may further including the step of:

at the UE, using the message index and the fourth data table to derive the power ratio of the DM-RS to data symbols transmitted to the UE.

In a second aspect, the invention provides User Equipment (UE) forming part of a telecommunication network with a Base transceiver Station (BTS) in which downlink control signalling for downlink multiple input/multiple output (MIMO) operation is transmitted between the BTS and the UE. In this aspect, the UE includes:

a memory device for maintaining one or more mapping tables at a network location accessible by the UE, the mapping tables including first UE signalling data; and processing means for receiving a message index to the UE to enable relevant first UE signalling data to be read by the UE;

receiving second UE signalling data to the UE; and using the first and second UE signalling data to derive UE control data.

Advantageous Effects of Invention

According to the Invention, one or more of the above-mentioned problems is/are ameliorated or overcome.

DESCRIPTION OF EMBODIMENTS

Figure 6:
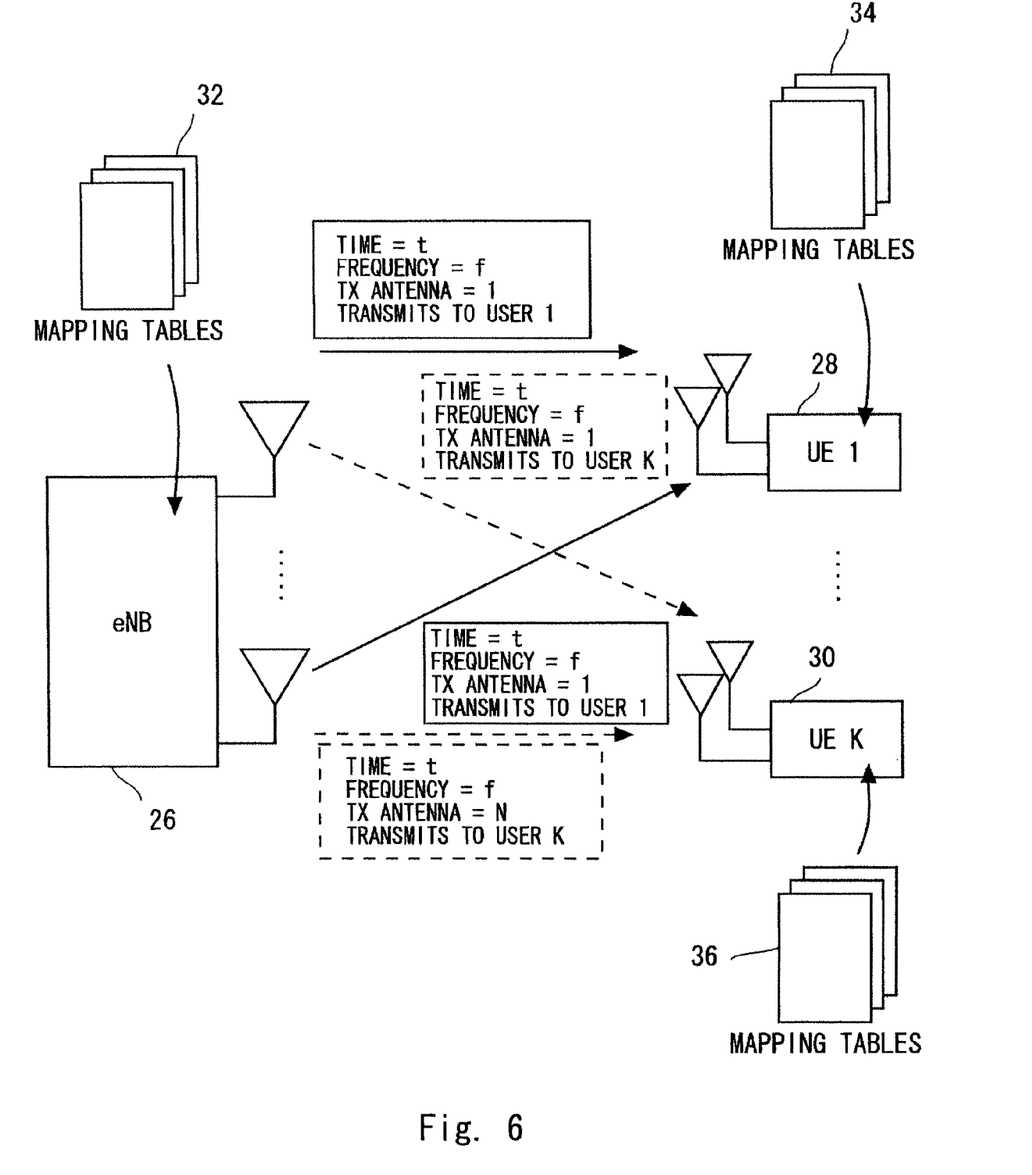
FIG. 6 is a schematic diagram depicting an eNB and UEs in MU-MIMO communication according to different embodiments of the present invention.

Referring now to FIG. 6, there is shown an eNB 26 in MU-MIMO communication with UEs 28 and 30. The eNB 26 and the UEs 28 and 30 each include memory devices for maintaining one or more mapping tables 32 to 36. In other embodiments of the invention, the mapping tables need not be stored within the eNB and the UEs but may be stored at another accessible location in a telecommunications network.

In the method of downlink control signalling for downlink MIMO operation between the eNB 26 and UEs 28 and 30, which will now be described, only a reduced but sufficient subset of necessary information required by the UE. This allows a reduction of overhead whilst maintaining SU/MU-MIMO transparency, and effectively signalling the assigned DMRS ports and the power ratios to the UE. If MU-MIMO operation is enabled as a MU-MIMO transmission mode, the method also provides the downlink control signalling to support such an operation.

Two different embodiments of this method will now be described:

<Method 1: Signalling Layers and Group Information>

Using this embodiment, the following information is signalled to each UE:

(*) Total number of layers used by eNB for each DM-RS CDM group (*) DM-RS ports assigned to the UE.

This is achieved using the following steps:

Step 1: Define Groups

With this embodiment, the DM-RS ports are divided into two CDM groups corresponding to the DM-RS mapping as shown in FIG. 5. From this figure, let ports 0, 1, 4 and 5 be included in CDM Group 1 and ports 1, 2, 3, 6, and 7 be included in CDM Group 2.

Step 2: Define Mapping Tables

Either one of the following information can be conveyed to the UE:

(1) The total number of layers used by the eNB and the layers assigned to a particular group (a control message index mapping table can be defined as shown in Table 1).

(2) The number of layers assigned to CDM Group 1 and CDM Group 2 (a control message index mapping table can be defined as shown in Table 2).

Assuming the DM-RS ports assigned to the UE is always continuous, a table mapping the rank and the smallest DM-RS port index to the actual DM-RS port assignment (an example is shown in Table 3) is also determined. Note that the assumption of continuous port assignment is strictly speaking not necessary but it reduces the control signalling overhead greatly. There are also other signalling methods with the assumption, signalling rank and the smallest DM-RS port index is just one example.

A table defining the power offsets can also be specified based on the total number of layers used and the number of layers for Group 1 and 2 (see Table 4). The entries in the table are calculated assuming $NP_{DMRS} = MP_{PDSCH}$, where N is the number of layers used in a DM-RS CDM group, M is the total number of layers used for PDSCH data transmission, $P_{DMRS}$ is the power of DM-RS per layer and $P_{PDSCH}$ is the power of PDSCH per layer. The power ratio corresponding to a CDM group is determined by $P_{DMRS}/P_{PDSCH} = M/N$.

All tables are known to all UEs and the eNB.

Note that the tables are constructed assuming maximum of 8 transmission layers is supported in the cell. If the maximum supported number of layers is fewer than 8 (e.g. 4 is also a typical configuration) then the resultant tables are clearly just subsets of the tables shown here.

TABLE 1

Signalling of the total # layers and the # layers for one of the DM-RS CDM groups (example of Method 1)

| Message Index | Total # layers | # Layers for CDM Group 1 |
|---|---|---|
| 0 | 1 | 0 |
| 1 | 1 | 1 |
| 2 | 2 | 0 |
| 3 | 2 | 1 |
| 4 | 2 | 2 |
| 5 | 3 | 0 |
| 6 | 3 | 1 |
| 7 | 3 | 2 |
| 8 | 3 | 3 |
| 9 | 4 | 0 |
| 10 | 4 | 1 |
| 11 | 4 | 2 |
| 12 | 4 | 3 |
| 13 | 4 | 4 |
| 14 | 5 | 1 |
| 15 | 5 | 2 |
| 16 | 5 | 3 |
| 17 | 5 | 4 |
| 18 | 6 | 2 |
| 19 | 6 | 3 |
| 20 | 6 | 4 |
| 21 | 7 | 3 |
| 22 | 7 | 4 |
| 23 | 8 | 4 |
| 24 | reserved | |
| 25 | reserved | |
| 26 | reserved | |
| 27 | reserved | |
| 28 | reserved | |
| 29 | reserved | |
| 30 | reserved | |
| 31 | reserved | |

TABLE 2

Signalling of # layers for each DM-RS CDM group (example of Method 1)

| Message Index | # Layers for CDM Group 1 | # Layers for CDM Group 2 |
|---|---|---|
| 0 | 0 | 1 |
| 1 | 0 | 2 |
| 2 | 0 | 3 |
| 3 | 0 | 4 |
| 4 | 1 | 0 |
| 5 | 1 | 1 |
| 6 | 1 | 2 |
| 7 | 1 | 3 |
| 8 | 1 | 4 |
| 9 | 2 | 0 |
| 10 | 2 | 1 |
| 11 | 2 | 2 |
| 12 | 2 | 3 |
| 13 | 2 | 4 |
| 14 | 3 | 0 |
| 15 | 3 | 1 |
| 16 | 3 | 2 |
| 17 | 3 | 3 |
| 18 | 3 | 4 |
| 19 | 4 | 0 |
| 20 | 4 | 1 |
| 21 | 4 | 2 |
| 22 | 4 | 3 |
| 23 | 4 | 4 |
| 24 | reserved | |
| 25 | reserved | |
| 26 | reserved | |
| 27 | reserved | |
| 28 | reserved | |
| 29 | reserved | |
| 30 | reserved | |
| 31 | reserved | |

TABLE 3

Assignment of DM-RS ports given the signalled rank and DM-RS port index
(example)

| Rank (signalled) | DM-RS port index(signalled) | | | | | | | |
|---|---|---|---|---|---|---|---|---|
| | 0 | 1 | 2 | 3 | 4 | 5 | 6 | 7 |
| 1 | 0 | 1 | 2 | 3 | 4 | 5 | 6 | 7 |
| 2 | 0, 1 | 1, 2 | 2, 3 | 3, 4 | 4, 5 | 5, 6 | 6, 7 | 7, 0 |
| 3 | 0, 1, 2 | 1, 2, 3 | 2, 3, 4 | 3, 4, 5 | 4, 5, 6 | 5, 6, 7 | 6, 7, 0 | 7, 0, 1 |
| 4 | 0, 1, 2, 3 | 1, 2, 3, 4 | 2, 3, 4, 5 | 3, 4, 5, 6 | 4, 5, 6, 7 | 5, 6, 7, 0 | 6, 7, 0, 1 | 7, 0, 1, 2 |
| 5 | 0, 1, 2, 3, 4 | 1, 2, 3, 4, 5 | 2, 3, 4, 5, 6 | 3, 4, 5, 6, 7 | 4, 5, 6, 7, 0 | 5, 6, 7, 0, 1 | 6, 7, 0, 1, 2 | 7, 0, 1, 2, 3 |
| 6 | 0, 1, 2, 3, 4, 5 | 1, 2, 3, 4, 5, 6 | 2, 3, 4, 5, 6, 7 | 3, 4, 5, 6, 7, 0 | 4, 5, 6, 7, 0, 1 | 5, 6, 7, 0, 1, 2 | 6, 7, 0, 1, 2, 3 | 7, 0, 1, 2, 3, 4 |
| 7 | 0, 1, 2, 3, 4, 5, 6 | 1, 2, 3, 4, 5, 6, 7 | 2, 3, 4, 5, 6, 7, 0 | 3, 4, 5, 6, 7, 0, 1 | 4, 5, 6, 7, 0, 1, 2 | 5, 6, 7, 0, 1, 2, 3 | 6, 7, 0, 1, 2, 3, 4 | 7, 0, 1, 2, 3, 4, 5 |
| 8 | 0, 1, 2, 3, 4, 5, 6, 7 | 0, 1, 2, 3, 4, 5, 6, 7 | 0, 1, 2, 3, 4, 5, 6, 7 | 0, 1, 2, 3, 4, 5, 6, 7 | 0, 1, 2, 3, 4, 5, 6, 7 | 0, 1, 2, 3, 4, 5, 6, 7 | 0, 1, 2, 3, 4, 5, 6, 7 | 0, 1, 2, 3, 4, 5, 6, 7 |

TABLE 4

Power ratios for DM-RS CDM group 1 and group 2
(example assuming DM-RS pattern of FIG. 5)

| Total # layers | # Layers for DM-RS CDM group 1 | # Layers for DM-RS CDM group 2 | Number of DM-RS REs in an RB | Power ratio for DM-RS CDM group 1 | Power ratio for DM-RS CDM group 2 |
|---|---|---|---|---|---|
| 1 | 1 | 0 | 12 | 1 | N/A |
| 1 | 0 | 1 | 12 | N/A | 1 |
| 2 | 2 | 0 | 12 | 1 | N/A |
| 2 | 0 | 2 | 12 | N/A | 1 |
| 2 | 1 | 1 | 24 | 2 | 2 |
| 3 | 3 | 0 | 12 | 1 | N/A |
| 3 | 0 | 3 | 12 | N/A | 1 |
| 3 | 2 | 1 | 24 | 1.5 or 3/2 | 3 |
| 3 | 1 | 2 | 24 | 3 | 1.5 or 3/2 |
| 4 | 4 | 0 | 12 | 1 | N/A |
| 4 | 0 | 4 | 12 | N/A | 1 |
| 4 | 3 | 1 | 24 | 1.33 or 4/3 | 4 |
| 4 | 2 | 2 | 24 | 2 | 2 |
| 4 | 1 | 3 | 24 | 4 | 1.33 or 4/3 |
| 5 | 4 | 1 | 24 | 1.25 or 5/4 | |
| 5 | 3 | 2 | 24 | 1.67 or 5/3 | 2.5 or 5/2 |
| 5 | 2 | 3 | 24 | 2.5 or 5/2 | 1.67 or 5/3 |
| 5 | 1 | 4 | 24 | 5 | 1.25 or 5/4 |
| 6 | 4 | 2 | 24 | 1.5 or 3/2 | 3 |
| 6 | 3 | 3 | 24 | 2 | 2 |
| 6 | 2 | 4 | 24 | 3 | 1.5 or 3/2 |
| 7 | 4 | 3 | 24 | 1.75 or 7/4 | 2.33 or 7/3 |
| 7 | 3 | 4 | 24 | 2.33 or 7/3 | 1.75 |
| 8 | 4 | 4 | 24 | 2 | 2 |

Step 3: eNB signals information

Figure 7:
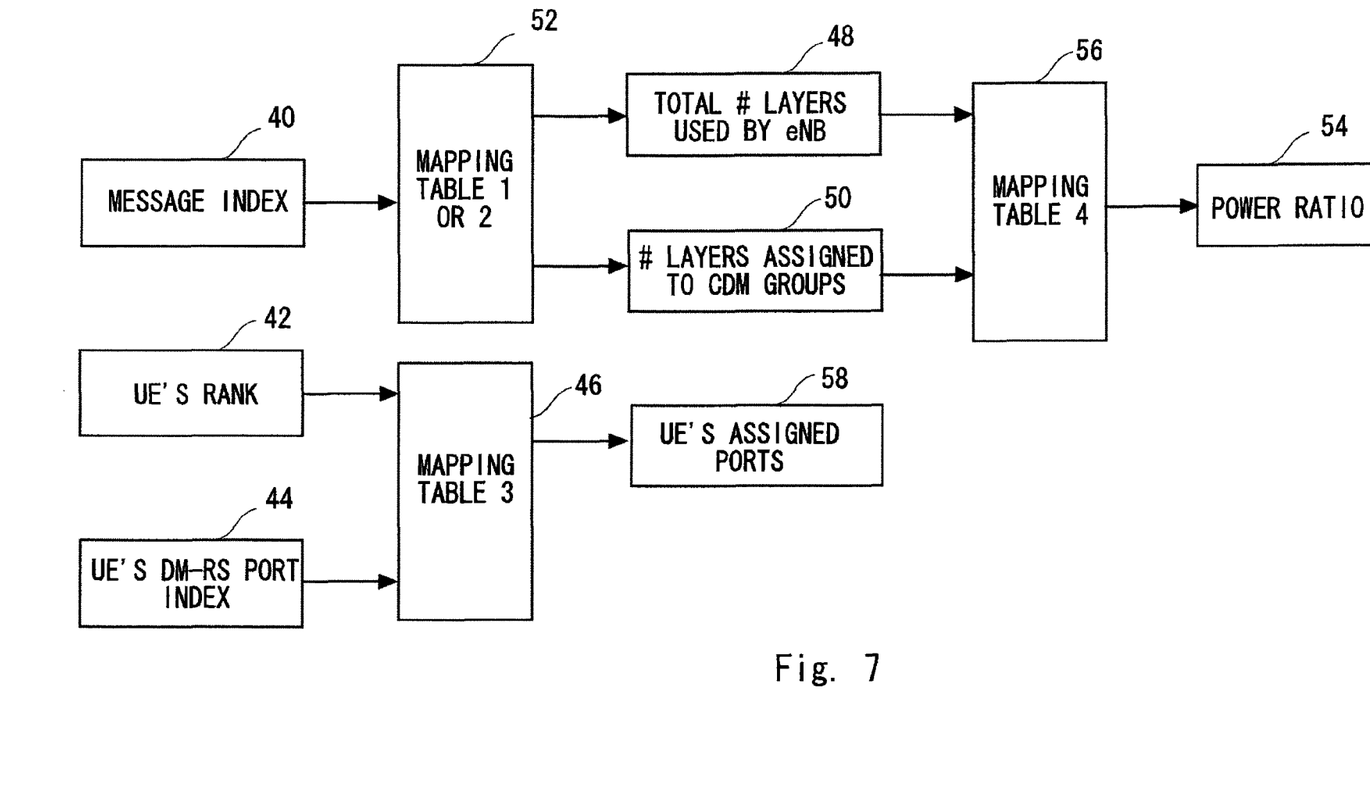
FIG. 7 is a flow chart depicting the flow of data in the eNB and UEs of FIG. 6.

Referring now to FIG. 7, the eNB signals the following information to each UE:

(*) message index 40 taken from the mapping table which is known to both eNB and all UEs (Table 1 or Table 2)

(*) UE's rank 42

(*) UE's DM-RS port index 44 (smallest port index).

Step 4: UE interprets rank and DM-RS port index

From the rank and DM-RS port index information, the UE determines the UE's assigned ports 58 using the appropriate mapping table 46 (Table 3).

Step 5: UE Interprets Message Index from Table 1 or Table 2

Upon receiving the message index, the UE determines the total number 48 of layers being used by the eNB and the number 50 of layers assigned to CDM Group 1 and 2 from the appropriate mapping table 52 (Table 1 or Table 2).

Step 6: UE Determines Power Ratio

Using the total number of layers used and the number of layers assigned to CDM Groups 1 and 2, the power ratio 54 between the DM-RS and data (PDSCH) symbols can be determined from the appropriate mapping table 56 (Table 4).

<Method 2: Signalling Power Ratio Information>

Using this embodiment, the following information is signalled to each UE:

(*) Power ratio information (*) Number of layers assigned to UE (rank)

(*) DM-RS port index assigned to each UE.

This is achieved using the following steps:

Step 1: Define Tables

To reduce the signalling overhead, each unique power ratio in Table 4 can be mapped to an index. An example is shown in Table 5 for maximum of 8 transmission layers. Note that some entries in the table are not necessary and hence can be removed if the maximum number of transmission layers supported in the cell is smaller.

The mapping between rank and DM-RS port index as shown in Table 3 is also defined. All tables are known to all UEs and the eNB.

TABLE 5

Power ratio signalling
(example of Method 2)

| Message Index | Power ratio |
|---|---|
| 0 | 1 |
| 1 | 1.25 |
| 2 | 1.33 |
| 3 | 1.5 |
| 4 | 1.67 |
| 5 | 1.75 |
| 6 | 2 |
| 7 | 2.33 |
| 8 | 2.5 |
| 9 | 3 |
| 10 | 4 |
| 11 | 5 |
| 12 | reserved |
| 13 | reserved |
| 14 | reserved |
| 15 | reserved |

Step 2: eNB Signals Information

Figure 8:
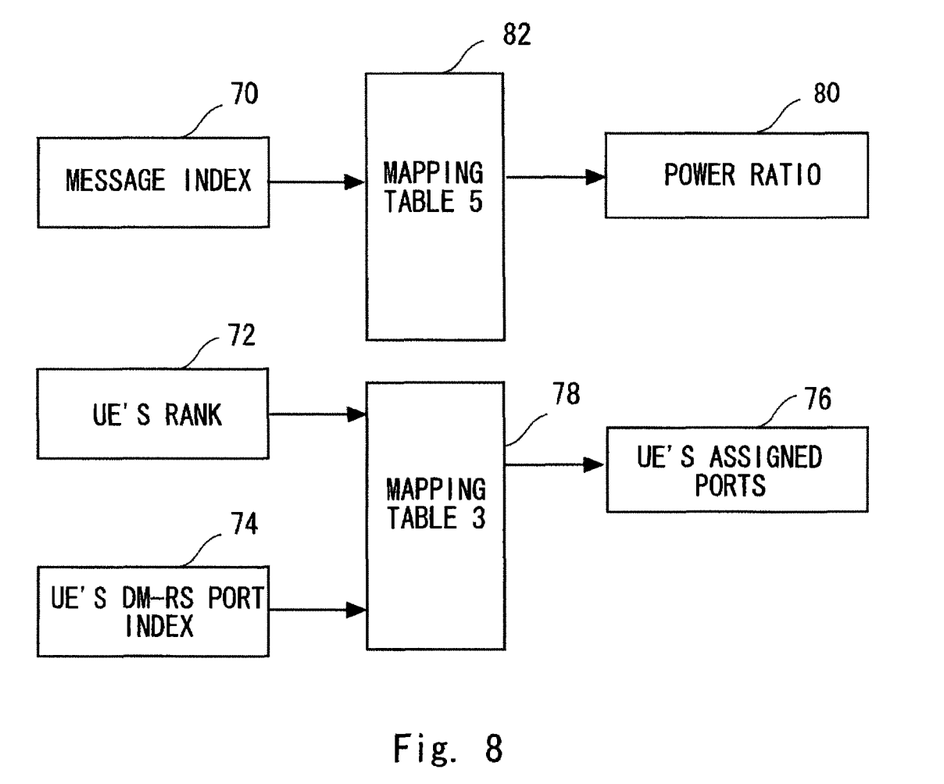
FIG. 8 is a flow chart depicting the flow of data in the eNB and UEs of FIG. 6.

Referring now to FIG. 8, the eNB signals the following information to each UE:

(*) message index 70 taken from the mapping table which is known to both eNB and all UEs (Table 5)

(*) UE's rank 72

(*) UE's DM-RS port index 74.

Step 3: UE Interprets Rank and DM-RS Port Index

From the rank and DM-RS port index information, the UE determines the UE's assigned ports 76 using the appropriate mapping table 78 (Table 3).

Step 4: UE Interprets Power Ratio From Table 5

UE infers the power ratio 80 for each DM-RS Group from the message index. The power ratio from the appropriate mapping table 82 (Table 5) can correspond to the DM-RS CDM group that the smallest port index signalled by the eNB belongs. The power ratio of the other CDM group can then be determined from mapping table 82.

Different control information using either Method 1 or Method 2 may be signalled for each resource block assigned to the UE, or the same control information can be applied to all resource blocks assigned to the UE. The latter greatly reduces the control overhead at the expense of scheduling flexibility.

Advantages of Method 1:

(*) UE knows exactly how many layers have been used by the eNB for each DM-RS CDM Group. Hence, it is easier to implement multi-user interference suppression at the UE.

Disadvantages of Method 1:

(*) If a common signalling is applied to all resource blocks assigned to the UE to save control overhead, excessive restriction on the scheduler is imposed.

(*) The number of control signalling bits required is more than that required for Method 2.

Advantages of Method 2:

(*) Method 2 can preserve more scheduler flexibility compared to Method 1 if a common signalling is applied to all resource blocks assigned to the UE to save control overhead. The reason is as follows: assuming a message index for Method 1 is applied for all RBs assigned in a subframe to the UE essentially defines the number of DM-RS ports that can be used by the eNB for each CDM group for all the RBs concerned, which also defines the total number of transmission layers for all RBs concerned. On the other hand, a message index for Method 2 can allow for more than one possible total number of transmission layers to be used by the eNB. For example, if the power ratio signalled is 2, from Table 5, a total of 2, 4, 6, or 8 transmission layers are possible. Hence, the total number of transmission layers for each of the RB assigned in the same subframe can still vary, although the UE will have no knowledge of it.

(*) The number of control signalling bits required is fewer than that required for Method 1.

Disadvantages of Method 2:

(*) It is more difficult compared to Method 1 to implement multi-user interference suppression at the UE, although it is not impossible with more complex UE processing or with further improvement of the control signalling design.

In the foregoing description, it has been assumed that:

(*) The DM-RS mapping using CDM and FDM (similar but not necessarily identical to FIG. 3 to FIG. 5 is adopted).

(*) The power amplifiers are required to be fully utilised and the total transmit power of all layers corresponding to a resource element is kept constant.

(*) The total powers allocated to all UEs sharing the same resource blocks are the same.

The above-described method of downlink control signalling constructs a framework of mapping tables from which the UE can work out all information pertaining to DM-RS to data power ratio, DM-RS port assignment and rank allocation. By transmitting a reduced set of information, the overhead signalling is reduced thereby making the overall system more efficient. The mapping tables also allow for transparent SU/MU-MIMO operation. The effective signalling of control information such that the power ratios between DM-RS and data is known to the UE allows a constant total transmit power to be maintained.

While the present invention has been described in conjunction with a limited number of embodiments, it will be apparent to those skilled in the art that many alternatives, modifications and variations in light of the foregoing description are possible. Accordingly, the present invention is intended to embrace all such alternatives, modifications and variations as may fall within the spirit and scope of the invention as disclosed.

INDUSTRIAL APPLICABILITY

This invention can be applied to a method of downlink control signalling for downlink multiple input/multiple output operation between a Base Transceiver Station and User Equipment.

REFERENCE SIGNS LIST 26 eNB(evolved Node B)
28 UE(User Equipment)
30 UE(User Equipment)
32 mapping table
34 mapping table
36 mapping table.

The invention claimed is:

1. A method of downlink control signalling for downlink multiple input/multiple output (MIMO) operation between a Base Transceiver Station (BTS) and User Equipment (UE), the method including the steps of:

maintaining one or more mapping tables at a network location accessible by the UE, the mapping tables including first UE signalling data;
transmitting a message index to the UE to enable relevant first UE signalling data to be read by the UE;
transmitting second UE signalling data to the UE;
at the UE, using the first and second UE signalling data to derive UE control data;
wherein a second of the mapping tables maps the message index to the number of transmission layers assigned to a first code division multiplexing (CDM) group of demodulation reference signals (DM-RS) ports,
at the UE, using the transmitted message index and the second mapping table to determine the total number of transmission layers used by the BTS and the number of transmission layers assigned to one or more CDM groups of DM-RS ports;
wherein a third of the mapping tables maps the total number of transmission layers used by the BTS and the number of transmission layers assigned to the one or more CDM groups of DM-RS ports to the power ratio of the DM-RS to data symbols transmitted to the UE, and
at the UE, using the total number of transmission layers used by the BTS, the number of transmission layers assigned to the one or more CDM groups of DM-RS ports and the third mapping table to derive the power ratio of the DM-RS to data symbols transmitted to the UE.

2. The method according to claim 1, wherein the UE control data includes UE rank and UE DM-RS port assignments.

3. The method according to claim 2, wherein the UE control data further includes a power ratio of the DM-RS to data symbols transmitted to the UE.

4. The method according to claim 1, wherein a first of the mapping tables maps the second UE signalling data to the UE's assigned DM-RS ports.

5. The method according to claim 4, wherein the second UE signalling data includes UE rank and a UE DM-RS port index.

6. The method according to claim 4, and further including:
at the UE, using the second UE signalling data and the first mapping table to determine UE DM-RS port assignments.

7. The method according to claim 1, wherein the second mapping table also maps the message index to the total number of transmission layers assigned to all DM-RS ports.

8. The method according to claim 1, wherein the second mapping table also maps the message index to the number of transmission layers assigned to a second CDM group of DM-RS ports.

9. The method according to claim 1, wherein a fourth of the mapping tables maps the message index to the power ratio of the DM-RS to data symbols transmitted to the UE, the method further including the step of:
at the UE, using the message index and the fourth data table to derive the power ratio of the DM-RS to data symbols transmitted to the UE.

* * * * *